United States Patent
De Boer et al.

(10) Patent No.: US 7,793,280 B2
(45) Date of Patent: Sep. 7, 2010

(54) METHOD AND ARRANGEMENT FOR INSTALLING A SOFTWARE MODULE IN A DEVICE

(75) Inventors: Gerrit De Boer, Hildesheim (DE); Juergen Knopke, Minden-Rodenbeck (DE)

(73) Assignee: Robert Bosch GmbH, Stuttgart (DE)

( * ) Notice: Subject to any disclaimer, the term of this patent is extended or adjusted under 35 U.S.C. 154(b) by 1108 days.

(21) Appl. No.: 10/497,067

(22) PCT Filed: Sep. 12, 2002

(86) PCT No.: PCT/DE02/03388

§ 371 (c)(1),
(2), (4) Date: Nov. 19, 2004

(87) PCT Pub. No.: WO03/048932

PCT Pub. Date: Jun. 12, 2003

(65) Prior Publication Data

US 2005/0081197 A1    Apr. 14, 2005

(30) Foreign Application Priority Data

Nov. 30, 2001 (DE) ................................ 101 58 991

(51) Int. Cl.
*G06F 9/445* (2006.01)

(52) U.S. Cl. .................. 717/169; 717/170; 717/171; 717/175; 717/176

(58) Field of Classification Search .............. None
See application file for complete search history.

(56) References Cited

U.S. PATENT DOCUMENTS

| 5,966,540 | A | 10/1999 | Lister et al. |
| 6,269,480 | B1 | 7/2001 | Curtis |
| 6,832,373 | B2 * | 12/2004 | O'Neill ................. 717/171 |
| 2003/0018964 | A1 * | 1/2003 | Fox et al. ............... 717/177 |
| 2004/0194084 | A1 * | 9/2004 | Matsunami et al. ..... 717/174 |

FOREIGN PATENT DOCUMENTS

| DE | 196 19 491 | 2/1997 |
| EP | 0 945 792 | 9/1999 |
| EP | 1 056 001 | 11/2000 |
| JP | 10222349 | 8/1998 |

* cited by examiner

*Primary Examiner*—Chuck O Kendall
(74) *Attorney, Agent, or Firm*—Kenyon & Kenyon LLP

(57) ABSTRACT

A method and arrangement for installing a software module in a device are provided, an operating system and a hardware-independent software environment such as a Java environment may be operated on the device and new software modules for the operating system may be installed via an interface with the software environment and an installation manager in the operating system. For this purpose, the software environment provides data to the installation manager via the installation interface. The installation manager, shielded from the software environment, then carries out the installation of the software module.

12 Claims, 2 Drawing Sheets

METHOD AND ARRANGEMENT FOR INSTALLING A SOFTWARE MODULE IN A DEVICE

FIELD OF THE INVENTION

The present invention is based on a method for installing a software module in a device.

BACKGROUND INFORMATION

According to German Published Patent Application No. 196 19 491, for the installation of software modules, in particular for expanding and updating the system software or the driver, a mechanism may be provided that enables a receiver user terminal, for example, to implement this installation in a secure and controlled manner. This is facilitated by the use of a device-independent, secure script language such as Perl or Java.

SUMMARY OF THE INVENTION

In contrast, the method according to the present invention for installing a software module in a device has the advantage over the related art that it allows an easier retrofitting of the operating system, the system-independent software environment being utilized in this context. This system-independent software environment, such as a Java processor, need not have knowledge of the operating system itself. This permits easier portability of the software environment and, furthermore, facilitates the updating or refitting of the operating system.

Software drivers may be considered part of the operating system. The method according to the present invention makes it possible to treat faults and to expand the system capabilities by retro-installation of appropriate software modules, such as operating system patches, drivers, operating system applications and diagnostic routines of systems that are at remote locations, such as via the Internet in connection with an air interface, for example, a radio interface. The mechanisms implemented in the software environment may be platform-independent. When changing the platform, i.e., the operating system or the hardware, a corresponding installation manager for the operating system may be reloaded while the installation interface to the call-up remains the same.

The data file may be entered into the system in a variety of ways. As soon as the data file is within the access range of the software environment the installation may begin. For example, in telematic user terminals the transmission may be, for example, from CD or in a wire-bound or wireless manner from a server or by memory board. Viewed from the source of the software generating the data file, a transparent transport path to the operating system installation manager may be available in the operating system area. The source need not have knowledge of the transport path, i.e., wireless, wire-bound. The configuration of the data file may be completely independent of the transport path since the mechanisms for authentication and transport security including an integrity check may be realized by means of the software environment, such as Java.

It may be advantageous that the data file additionally includes data concerning the source of the software module and/or at least one signature and/or encryption information and/or a text description and/or at least one software tool. In this way, it is possible to make the installation more secure and to avoid an unintended installation, which may result in malfunctioning or destruction of the device. Furthermore, the transmission of software tools allows an easier installation of the software module. The text description facilitates the installation of the software for a user.

Furthermore, it is advantageous that the data file, which may also be called a container, is divided into different fields. The first field may be provided for the identification, a so-called header, for instance. This header may include a certain identification of the software module. The required resources, i.e. the memory location, the drivers, etc. that are necessary for the software module, may be indicated in a second field. In a third field may be the installation commands, such as "copy" or "execute". The actual data of the software module may be included in a fourth field. Among these are the data-file name, the size of the data file name, the size of the data, the data itself and a check field. The data of the software module may be provided in compressed form and must then be decompressed, for example, by the installation manager. It is also possible to implement a formatting of these data of the software module in order to convert them into executable form. A signature, which allows increased security of the installation process, may be indicated in a fifth field.

Furthermore, a remote servicing or a remote diagnosis of the device is possible via the installation manager.

The device according to the present invention may then include a processor, a memory, a communication interface with an operating system and the system-independent software environment. According to the present invention, an installation interface is provided in the software environment and the installation manager in the operating system.

DETAILED DESCRIPTION

Figure 1:
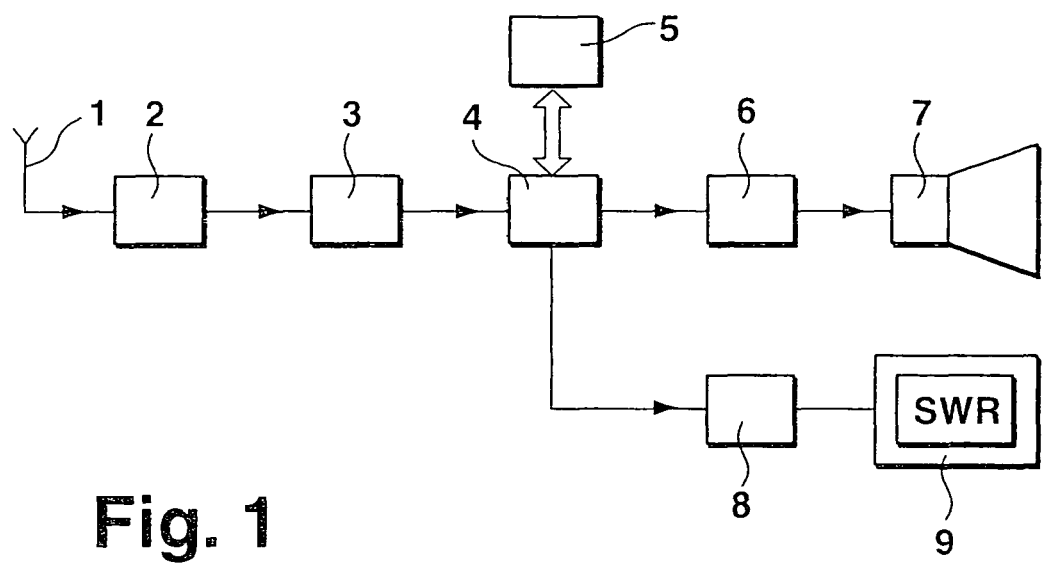
FIG. 1 shows a block diagram of an example embodiment of the device according to the present invention.

If the functioning scope or the capability of a system able to be configured via software is to be improved, a new software module may need to be installed. Some software environments, such as the Java virtual machine (JVM), in certain configurations, allow the easy installation of software in the form of data packets, such as applets or JAR data files, which are loaded via a server on the Internet, for example, and are then able to be started directly. Since the Java software is basically platform-independent, i.e., is able to be executed in any suitable JVM, the Java modules used for the software installation are likewise platform-independent and thus transmittable on any computer platform using a JVM.

However, the described procedure of the software installation initially may allow only the modification of the software running inside the JVM. Accessing software outside of the JVM or software that builds up directly on the operating system or which is part of the operating system, such as drivers or application software, may not be possible without additional measures. For instance, when installing software for a workstation, a software package in combination with an installation program is usually installed in an interactive manner.

However, for devices such as telematic devices, radio receivers and navigational devices, it may be necessary to make the installation of software modules as uncomplicated as possible and shield the installation from the user. According to the present invention, this may be achieved in that the software environment, i.e., a JVM, has an installation interface that allows the transmission of a data file, including the necessary installation data, to an installation manager which itself is arranged in the operating system. The installation manager then implements the actual installation shielded from the software environment. Remote access, remote installation, remote servicing and remote diagnosis, for example, are possible in this manner. Furthermore, by separating the operating system from the software environment, the importability of software environments, such as JVM, may be ensured even for such installations. At the same time, the JVM also allows the installation of operating systems in relevant software modules.

The software modules are transported and made available by methods provided by the JVM. The installation of the operating-system software module is subsequently initiated out of the JVM in that a corresponding installation program, i.e., the installation manager, is called up in the operating system. The interface with the installation program on the level of the operating system may be configured in such a way that no information concerning the installation of the operating-system software such as system resources, type of operating system, destination of the software test, must be available inside the JVM.

The present invention is intended for the flexible and expandable updating of the installed software on the level of the operating system of a computer system. Platform-independent mechanisms are utilized to transport the software into the system, these mechanisms may be made available by a software environment, such as "download" from a Java software into a JVR. Among these are methods for authentication, encryption and for the secure transport of the software into the system, which are provided by Java. In this context, the software may be loaded and stored in a packet such as a JAR archive. To install the software onto the level of the operating system, an installation manager in the operating system may be called up from the JVM to which the loaded software, the software module, may be handed over and which carries out the installation on the operating-system level. The installation manager itself may be platform-dependent and provided for each target platform. However, the call-up of the installation manager may be the same for all platforms, that is to say, the access, i.e., the installation interface with the installation manager, may always be the same in the view of a software environment such as the JVM.

A single data file, also called a "container" in the following, is handed over to the installation manager, this data file containing the entire information for the software module installation.

FIG. 1 shows a an example embodiment of the device according to the present invention as a circuit diagram, the device being a radio receiver, for example, and configured, for example, for the reception of digital radio signals, such as DAB (Digital Audio Broadcasting) or DRM (Digital Radio Mondiale) or DVB (Digital Video Broadcasting). These broad-band transmission methods allow the transmission of various data, among them also software modules, which are to be loaded into the operating system of a radio receiver. The radio receiver has an antenna 1, which is connected to an input of a high-frequency receiver 2, which amplifies, filters and converts the received radio signals. High-frequency receiver 2 may also be assigned an A/D converter, which digitizes the received radio signals.

Inside a digital component 3, the digital radio signals are then subjected to channel decoding and source decoding as well. The useful data thus decoded are then examined in a processor 4 and passed on prior to an application, i.e., an audio and/or video playback, for example. However, if software modules are involved that are to be loaded into the operating system of the radio receiver, processor 4 executes an installation procedure with the aid of a software environment, i.e., a Java virtual machine loaded in memory 5 via which the processor is connected to a data input/output. However, if audio data are present in the data flow, these are played back via an audio signal processor 6 and a loudspeaker 7. If video data are included in the received data, these data may be played back here, for example as SWR via a video-signal processor 8 and a video screen 9. Different display technologies may be utilized as video screen 9. For example, an LCD, other flat-screen technologies, and a cathode ray tube are counted among these.

Figure 2:
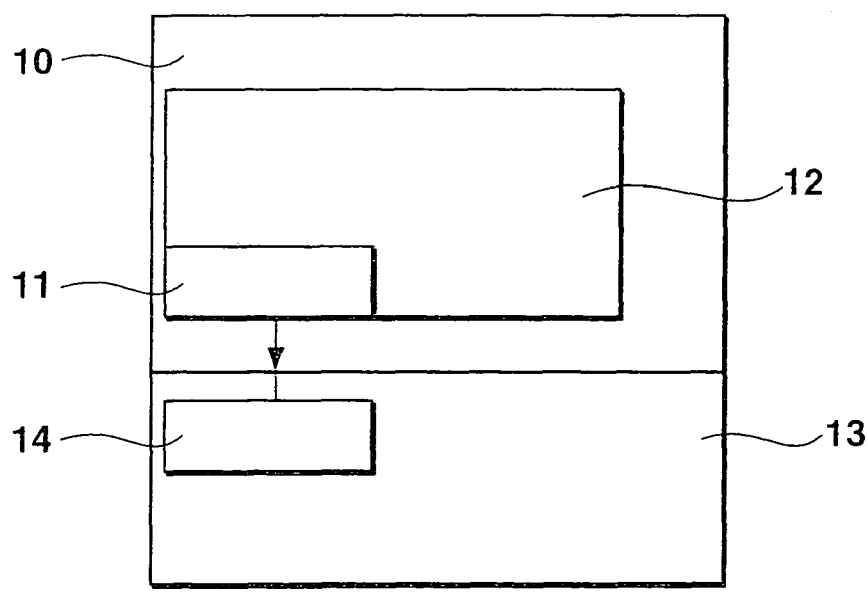
FIG. 2 shows the software architecture of an example embodiment of the device according to the present invention.

FIG. 2 shows how an example embodiment of the software that is loaded by processor 4 is structured. A platform-independent software environment 10 may be built up on an operating system 13, the software environment in this case being a Java virtual machine, i.e., JVM 10. Inside JVM 10 is a Java framework 12 in which the applications, the communication with servers and other applications are carried out. Also provided in Java framework 12 is installation interface 11, which establishes the connection to an installation manager 14 arranged in operating system 13. Parameters are transmitted to installation manager 14 via interface 11, these parameters indicating the location of the data file in which the installation data are specified. This part may also be called a container. In addition to the actual code for the software module and corresponding installation commands, the container, which includes the software module to be installed, may also include information concerning the source of the software signatures, encryption information, text descriptions up to temporary software tools required for the installation, i.e., installation check and the start-up tools. The container thereby also controls the installation and start-up of the software module.

Installation manager 14 extracts the container and interprets the installation instructions, which are called commands here. This may involve call-ups of the operating-system software, in the least complicated case the copying of data files into the data system or call-ups of temporary software tools, which were installed with the aid of previous subfiles, i.e., sub-containers. This also includes subsequent installation decisions, for example whether the system must be booted up (started) after installation. These mechanisms running during the installation procedure are executed in a manner that is completely shielded from JVM 10, which means JVM 10 has no information regarding the installation of the operating-system software, such as system resources, type of operating system, destination of the software and check. The operating system software to be installed, i.e., the software module, is transmitted via JVM 10 to the area of operating system 13, where it is installed, the transmission being carried out in a transparent manner when viewed by the source of the software container.

Figure 3:
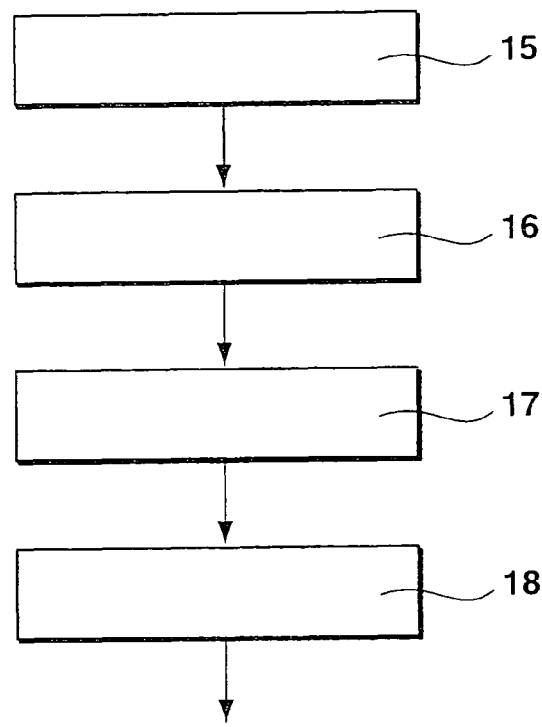
FIG. 3 shows a flow chart of the method according to an example embodiment of the present invention.

FIG. 3 shows an example embodiment of the method according to the present invention as a flow chart. In method step 15, the software module to be installed is received via a data-reception device. Instead of the radio signals shown in FIG. 1, which are provided for reception of the software module, it is also possible to utilize memory media, a duplex radio connection such as mobile radiocommunications (UMTS), a line-bound connection using the telephone network for instance, or a satellite-supported data connection. If the device according to the present invention in platform-independent software environment 10 has detected that a software module is involved that is to be installed with operating system 13, JVM 10 transfers corresponding parameters of the data file, which contains the software module, to an installation manager 14, using interface 11. With the aid of this data, installation manager 14 is then able to load the data file and to carry out the installation in method steps 17 and 18.

Figure 4:
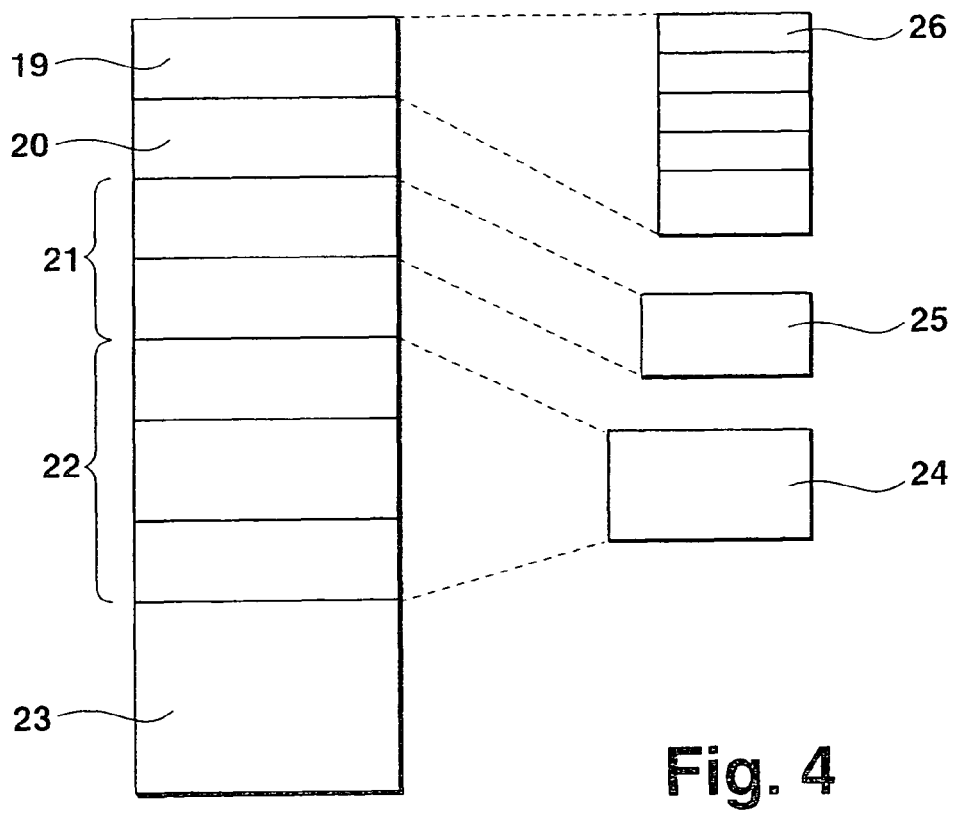
FIG. 4 shows an example embodiment of a file structure according to an example embodiment of the present invention.

FIG. 4 shows an exemplary configuration of the data file utilized by installation manager 14 for installing the software module. The data file has a first field, header 19, which is subdivided into various sub-fields as shown in block 26.

Header 19 is followed by a second field 20 for the required resources provided for the installation of the software module. Second field 20 is followed by a third field 21, which is made up of two so-called sub-containers in which the commands to be executed by installation manager 14 are indicated. Block 25 shows that such commands may be denoted by copy or execute. In a fourth field 22 additional sub-containers are listed, which may contain the data that make up the software module itself. In addition to the actual code for the software module, data may also be included concerning the size, the data-file name and check fields. Information regarding images, the size of the flags and the size of the instruction line are indicated here as well. This is represented via block 24. An overall signature is indicated in final field 23.

The method allows add-ons. In a system in which no installation manager was installed so far, it is possible, as a first step, to download a corresponding installation manager per JAR data file and to copy it into the operating-data system, using Java. In this case, the JAR data file not only includes the code for the installation manager and corresponding methods for copying the code into the operating-system data system, but also interfaces for the later accessing of the installation manager for the software download, which was shown here. The installation manager may also be reinstalled or updated at a later time using the existing installation manager, for example in order to increase the scope of the container commands or their performance.

If a system having a reverse channel is involved, such as a telematics device with an Internet connection, an additional development allows the installation result to be returned to the sender of the software in the form of positive or negative or an error report, so that further steps may be initiated if the installation was unsuccessful, such as a repeat of the download with correspondingly modified contents.

What is claimed is:

1. A method for installing a software module in a device, the method comprising:

operating an operating system and a device-independent software environment on a processor of the device, wherein the device-independent software environment includes an installation interface configured to interface with an installation manager program located in the operating system;

at the software environment, determining that the software module is to be installed within the operating system;

at the software environment, responsive to the determining that the software module is to be installed, calling up the installation manager and transferring a parameter identifying a location of a data file, the data file including the software module and at least one installation command, from the software environment to the installation manager, via the installation interface;

at the installation manager, locating the data file based on the parameter, loading the data file and extracting the software module along with the at least one installation command; and performing the installation of the software module via the installation manager, including executing the at least one installation command at the installation manager, the installation occurring solely within the operating system and hidden from the software environment.

2. The method of claim 1, wherein the data file includes at least one of data concerning the source of the software module, at least one signature, an encryption information, a text description, and at least one software tool.

3. The method of claim 2, wherein the data file includes a first field configured for an identification, a second field for required resources for the software module, a third field for the at least one installation command, a fourth field for the software module, and a fifth field for the at least one signature.

4. The method of claim 1, further comprising:

implementing at least one of remote servicing and remote diagnosis via the installation manager.

5. The method of claim 1, further comprising:

issuing a report about a result of the installation.

6. A system for installing a software module in a device, comprising:

a computer program executable with a processor and operable to perform the following:

operating an operating system and a device-independent software environment on a processor of the device, wherein the device-independent software environment includes an installation interface configured to interface with an installation manager program located in an operating system;

at the software environment, determining that the software module is to be installed within the operating system;

at the software environment, responsive to the determining that the software module is to be installed, calling up the installation manager and transferring a parameter identifying a location of a data file, the data file including the software module and at least one installation command, from the software environment to the installation manager, via the installation interface;

at the installation manager, locating the data file based on the parameter, loading the data file and extracting the software module along with the at least one installation command; and performing the installation of the software module via the installation manager, including executing the at least one installation command at the installation manager, the installation occurring solely within the operating system and hidden from the software environment;

wherein the device includes a processor, a memory and a communication interface, and wherein the operating system, the software environment, the installation interface, and the installation manager are stored in the memory.

7. The system of claim 6, wherein the device includes a telematics device.

8. The system of claim 7, wherein the device includes one of a radio receiver, a navigation device, and an automotive PC.

9. The system of claim 6, wherein the data file includes at least one of data concerning the source of the software module, at least one signature, an encryption information, a text description, and at least one software tool.

10. The system of claim 9, wherein the data file includes a first field configured for an identification, a second field for required resources for the software module, a third field for the at least one installation command, a fourth field for the software module, and a fifth field for the at least one signature.

11. The system of claim 6, wherein at least one of remote servicing and remote diagnosis is implemented via the installation manager.

12. The system of claim 6, wherein a report is issued about a result of the installation.

* * * * *